(12) United States Patent
Jo et al.

(10) Patent No.: US 11,613,113 B2
(45) Date of Patent: Mar. 28, 2023

(54) THERMAL LAMINATION APPARATUS FOR MANUFACTURING FILM-LAMINATED METAL PLATE

(71) Applicants: Ig Lae Jo, Changwon-si (KR); Yong Je Kang, Busan (KR)

(72) Inventors: Ig Lae Jo, Changwon-si (KR); Yong Je Kang, Busan (KR)

( * ) Notice: Subject to any disclaimer, the term of this patent is extended or adjusted under 35 U.S.C. 154(b) by 0 days.

(21) Appl. No.: 17/574,372

(22) Filed: Jan. 12, 2022

(65) Prior Publication Data
US 2022/0242102 A1 Aug. 4, 2022

(30) Foreign Application Priority Data

Feb. 1, 2021 (KR) .................. 10-2021-0013941

(51) Int. Cl.
| | | |
|---|---|---|
| *B32B 37/00* | (2006.01) | |
| *B32B 15/09* | (2006.01) | |
| *B32B 27/36* | (2006.01) | |
| *B32B 37/06* | (2006.01) | |
| *B32B 37/08* | (2006.01) | |

(52) U.S. Cl.
CPC .......... *B32B 37/0053* (2013.01); *B32B 15/09* (2013.01); *B32B 27/36* (2013.01); *B32B 37/06* (2013.01); *B32B 37/08* (2013.01); *B32B 2311/00* (2013.01); *B32B 2367/00* (2013.01)

(58) Field of Classification Search
CPC ............ B32B 15/09; B32B 2037/0092; B32B 2311/00; B32B 2367/00; B32B 27/36; B32B 37/0053; B32B 37/06; B32B 37/08; B32B 37/203; B32B 38/06; G03B 2213/025
See application file for complete search history.

(56) References Cited

FOREIGN PATENT DOCUMENTS

| | | | |
|---|---|---|---|
| JP | 2004-338151 A | 12/2004 | |
| KR | 10-1999-0067285 A | 8/1999 | |
| KR | 10-2010-0116818 A | 11/2010 | |
| KR | 10-1265003 B1 | 5/2013 | |
| KR | 2263007 B1 * | 6/2021 | ............. B32B 15/08 |

OTHER PUBLICATIONS

English translation of written opinion of JP2022007371.*
English translation of JP2001105494.*
English translation of written decision of KR20210013941.*

* cited by examiner

*Primary Examiner* — Sonya M Sengupta
(74) *Attorney, Agent, or Firm* — Rabin & Berdo, P.C.

(57) ABSTRACT

A thermal lamination apparatus for manufacturing a film-laminated metal plate is disclosed. The thermal lamination apparatus includes an uncoiling unit from which a metal plate coil is uncoiled, a metal plate descent tower including a platform and a metal plate discharge portion formed in the platform, an ascent induction unit for guiding a metal plate unwound from the metal plate coil to a region above the platform, a vertical descent induction unit for inducing the metal plate to descend vertically through the metal plate discharge portion, a heating unit disposed below the platform to heat the metal plate, a film supply unit for supplying a film to at least one surface of the metal plate heated by the heating unit, a lamination unit for pressing the heated metal plate and the film to acquire a film-laminated metal plate, and a re-coiling unit for re-coiling the film-laminated metal plate.

10 Claims, 5 Drawing Sheets

THERMAL LAMINATION APPARATUS FOR MANUFACTURING FILM-LAMINATED METAL PLATE

BACKGROUND OF THE INVENTION

Field of the Invention

The present invention relates to the manufacture of a film-laminated metal plate, and more particularly to a thermal lamination apparatus for thermally laminating a film onto one surface or both surfaces of a metal plate.

Description of the Related Art

A film-laminated metal plate, which is formed by laminating a polyethylene terephthalate (PET) film or the like onto the surface of a steel plate, such as a galvanized steel plate or a tin-plated steel plate, or the surface of any other metal plate, is used, for example, for cases for home appliances such as refrigerators, washing machines, and TVs. Due to the PET film laminated thereon, a film-laminated metal plate has advantages of excellent aesthetics, as well as improved scratch resistance, durability, and workability.

Conventionally, an adhesive is applied to the surface of a metal plate, and a PET film is laminated onto the surface of the metal plate using the adhesive. However, this conventional art has problems in that the process of laminating the PET film incurs high costs, is less productive, and has a high defect rate and in that organic compounds (VOCs), which are harmful to the human body, are generated due to use of a volatile organic solvent included in the adhesive in the manufacturing process.

RELATED ART DOCUMENT

Patent Document

Korean Patent Registration No. 10-1265003 (Registered on May 9, 2013)

SUMMARY OF THE INVENTION

Therefore, the present invention has been made in view of the above problems, and it is an object of the present invention to provide a thermal lamination apparatus for thermally laminating a film onto one surface or both surfaces of a metal plate without using an adhesive.

However, the objects to be accomplished by the present invention are not limited to the above-mentioned object, and other objects not mentioned herein will be clearly understood by those skilled in the art from the following description.

A thermal lamination apparatus for manufacturing a film-laminated metal plate according to an aspect of the present invention for accomplishing the above and other objects includes an uncoiling unit configured to rotatably support a metal plate coil to allow the metal plate coil to be uncoiled therefrom, a metal plate descent tower including a platform disposed so as to be spaced a predetermined height above the surface of the ground and a metal plate discharge portion formed in the platform, an ascent induction unit configured to induce a metal plate unwound from the metal plate coil to move to the region above the platform, a vertical descent induction unit configured to induce the metal plate to descend vertically through the metal plate discharge portion from the region above the platform, a heating unit disposed below the platform in order to heat the metal plate descending vertically, a film supply unit configured to supply a film to at least one of both surfaces of the metal plate descending after being heated by the heating unit, a lamination unit configured to press the heated metal plate and the film to acquire a film-laminated metal plate, and a re-coiling unit configured to re-coil and hold the film-laminated metal plate.

The thermal lamination apparatus may further include a cooling roller configured to rapidly cool the film-laminated metal plate passing through the lamination unit, a heat-insulating chamber configured to heat the film-laminated metal plate cooled rapidly by the cooling roller, a pattern-forming unit configured to form a pattern on the film heated by the heat-insulating chamber, and a cooling unit configured to cool the film-laminated metal plate passing through the pattern-forming unit. The cooling roller, the heat-insulating chamber, the pattern-forming unit, and the cooling unit may be disposed between the lamination unit and the re-coiling unit.

The cooling roller, the heat-insulating chamber, and the pattern-forming unit may be disposed in a basement, which is located below the surface of the ground. An ascent induction roller may be disposed in the basement in order to convey the film-laminated metal plate passing through the pattern-forming unit to the ground. The cooling unit may include a plurality of rotation cooling rollers configured to cool the film-laminated metal plate conveyed to the ground by the ascent induction roller while contacting the film-laminated metal plate.

The film supply unit may include a first film supply unit and a second film supply unit configured to supply films to the metal plate descending after being heated by the heating unit. The lamination unit may include a pair of press rollers configured to press the films against the heated metal plate.

The thermal lamination apparatus may further include an uncoiling cutter configured to cut an end of the metal plate coil when the metal plate is completely unwound from the metal plate coil, a welder configured to weld the end of the metal plate coil cut by the uncoiling cutter to an end of a new metal plate coil loaded on the uncoiling unit, and a re-coiling cutter configured to cut the film-laminated metal plate when the film-laminated metal plate is completely wound around the re-coiling unit.

The thermal lamination apparatus may further include a primer application unit configured to apply a primer to one surface or both surfaces of the metal plate released from the uncoiling unit and a drying chamber configured to dry the primer while the metal plate coated with the primer is passing therethrough.

The primer application unit may include a first application roller configured to rotate while contacting the upper surface of the metal plate, a second application roller configured to rotate while contacting the lower surface of the metal plate, a first transfer roller configured to transfer the primer attached to the outer circumferential surface thereof to the first application roller, and a second transfer roller configured to transfer the primer attached to the outer circumferential surface thereof to the second application roller.

The ascent induction unit may include a lower conveyance power generation unit, which is disposed on the surface of the ground in front of the metal plate descent tower and includes an S-shaped array of rubber rollers to generate power required to convey the metal plate, an upper conveyance power generation unit, which is mounted on the platform of the metal plate descent tower and includes an S-shaped array of rubber rollers to generate power required to convey the metal plate, and at least one guide roller configured to guide the metal plate conveyed from the lower conveyance power generation unit to the upper conveyance power generation unit.

The vertical descent induction unit may include a descent guide roller configured to bend the metal plate conveyed along the platform to allow the metal plate to pass through the metal plate discharge portion and an aligner configured to align the metal plate when the metal plate passes through the metal plate discharge portion.

The heating unit may include an induction heater, and at least three temperature sensors may be arranged along the width of the metal plate to measure the temperatures of both ends and the center portion of the metal plate heated by the induction heater.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE INVENTION

Figure 1:
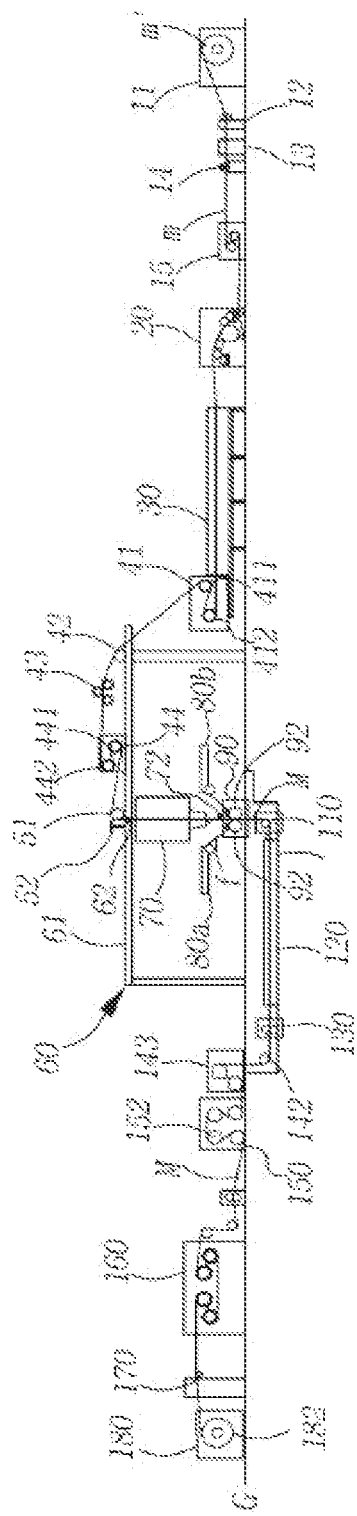
FIG. 1 is a diagram for explaining the overall configuration of a thermal lamination apparatus according to an embodiment of the present invention.

Hereinafter, embodiments of the present invention will be described in detail with reference to the accompanying drawings so that those skilled in the art to which the present invention pertains may easily carry out the embodiments. The present invention may, however, be embodied in many different forms, and should not be construed as being limited to the embodiments set forth herein.

In the drawings, the sizes or shapes of components may be exaggerated or schematically illustrated for clarity and convenience of description.

Also, the terms used in the following description are terms defined taking into consideration the functions obtained in accordance with the present invention, and may be changed in accordance with the option of a user or operator or a usual practice. Therefore, the definitions of these terms should be determined based on the total content of this specification.

A description of parts unrelated to the technical spirit of the present invention is omitted in order to clearly and briefly describe the present invention, and the same or extremely similar components are denoted by the same reference numerals throughout the specification.

In addition, in several exemplary embodiments, components having the same configuration will be representatively described using the same reference numerals in an exemplary embodiment, and only components different from those of an exemplary embodiment will be described in the other exemplary embodiments.

Throughout the specification, when an element is said to be "connected", "coupled", or "joined" to another element, the element and the other element may be "directly connected", "directly coupled", or "directly joined" to each other, or may be "indirectly connected", "indirectly coupled", or "indirectly joined" to each other with one or more intervening elements interposed therebetween. In addition, throughout the specification, when an element is referred to as "comprising", "including", or "having" another element, the element should not be understood as excluding other elements, so long as there is no special conflicting description, and the element may include at least one other element.

As shown in FIG. 1, a thermal lamination apparatus according to an embodiment of the present invention includes an uncoiling unit 11, which rotatably supports a metal plate coil m' and from which the metal plate coil m' is uncoiled, a metal plate descent tower 60, which includes a platform 61 disposed so as to be spaced a predetermined height above the surface of the ground G and a metal plate discharge portion 62 formed in the platform 61, an ascent induction unit 41, 42, 43, and 44, which induces a metal plate m unwound from the metal plate coil m' to move to the region above the platform 61, a vertical descent induction unit 51 and 52, which induces the metal plate m to descend vertically through the metal plate discharge portion 62 from the region above the platform 61, a heating unit 70, which is disposed below the platform 61 in order to heat the metal plate m, which descends vertically, first and second film supply units 80a and 80b, which supply films f to both surfaces of the metal plate m, which descends after being heated by the heating unit 70, a lamination unit 90, which presses the heated metal plate m and the films f to acquire a film-laminated metal plate M, and a re-coiling unit 180, which re-coils and holds the film-laminated metal plate M.

Figure 2:
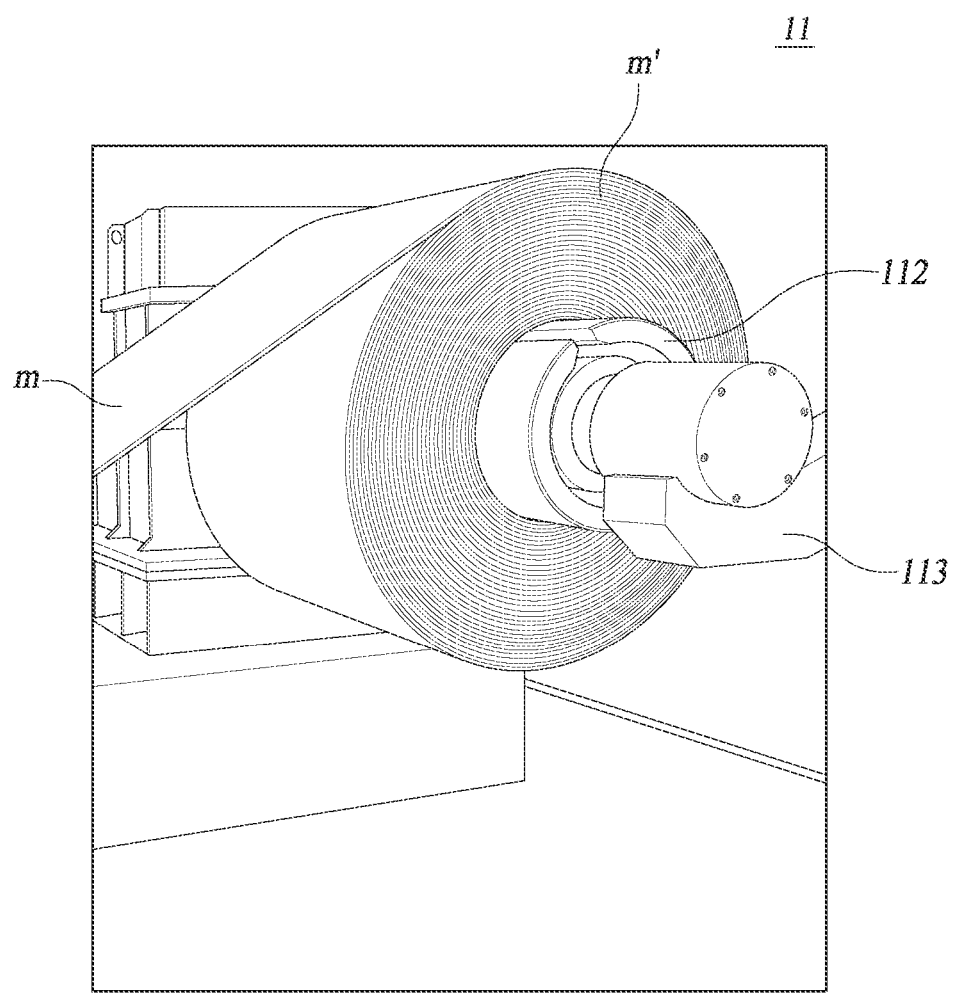
FIG. 2 is a picture for explaining an uncoiling unit of the thermal lamination apparatus according to an embodiment of the present invention.

Referring to FIG. 2, the uncoiling unit 11 includes an uncoiling roller 112, which is rotated by a hydraulic motor. The uncoiling roller 112 rotatably supports the coiled metal plate, i.e. the metal plate coil m', and allows the metal plate m to be unwound in one direction by the force of pulling the metal plate m. A pneumatic shaft support 113 for supporting the rotation shaft of the uncoiling roller 112 may be additionally provided. The shaft support 113 disperses the load that is applied to the uncoiling roller 112 due to the weight of the metal plate coil m', thereby preventing the uncoiling roller 112 from being overloaded. A coil car is used to load and unload the metal plate coil m'. Before the coil car is used, a separate coil support is used to support the metal plate coil m'.

Referring again to FIG. 1, the thermal lamination apparatus according to an embodiment of the present invention includes a loader 12, an uncoiling cutter 13, a welder 14, and an initial conveyance power generation unit 15, which are disposed between the uncoiling unit 11 and the ascent induction unit 41, 42, 43, and 44. The loader 12, the uncoiling cutter 13, the welder 14, and the initial conveyance power generation unit 15 are sequentially arranged in the direction in which the metal plate m is unwound.

The loader 12 functions to assist in conveyance of the unwound metal plate m. The uncoiling cutter 13 functions to cut an end portion of the metal plate m when the metal plate m is completely unwound from the metal plate coil m', so that the cut end portion of the metal plate m can be welded to a metal plate m of a new metal plate coil m'.

The welder 14 functions to connect the end portion of the existing metal plate m to a metal plate m of a new metal plate coil m'. A hydraulic cutter may be advantageously used as the uncoiling cutter 13, and a TIG welder may be advantageously used as the welder 14. The initial conveyance power generation unit 15 includes a pair of rubber rollers in order to convey the metal plate m while tensioning the metal plate m in an S shape.

In addition, the thermal lamination apparatus according to an embodiment of the present invention includes a primer application unit 20 for applying a primer to one surface or both surfaces of the metal plate m released from the uncoiling unit 11. When laminating the film f onto one surface or both surfaces of the metal plate m, a water-soluble primer may be applied to one surface or both surfaces of the metal plate m in order to assist in the lamination of the film f. In the case in which the film f is laminated only onto one surface of the metal plate m, a primer may be applied only to one of the upper surface and the lower surface of the metal plate m. Alternatively, the primer application unit 20 may be omitted, so long as the film f can be reliably laminated onto the surface of the metal plate m only through the thermal lamination process due to the characteristics of the metal plate m and the film f. The primer application process may be omitted merely by unmounting primer containers, which will be described later, from the conveyance route of the metal plate m or removing primer from the primer containers.

Figure 3:
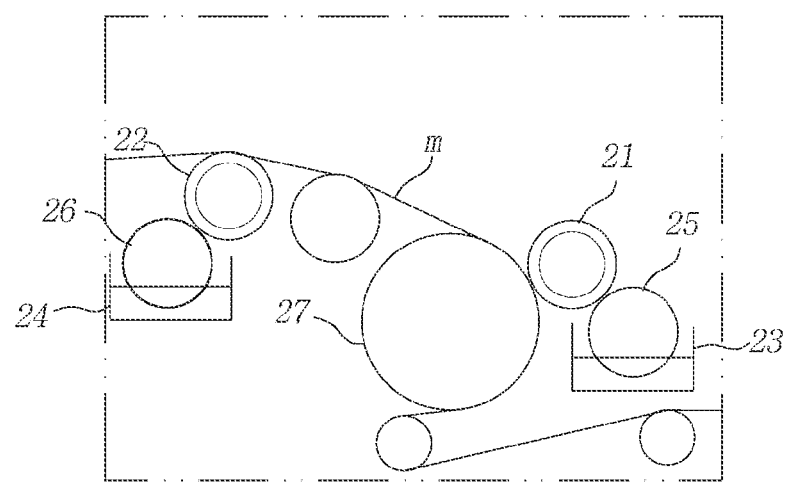
FIG. 3 is a diagram for explaining a primer application unit of the thermal lamination apparatus according to an embodiment of the present invention.

Referring to FIG. 3, the primer application unit 20 includes a first application roller 21, which rotates while contacting the upper surface of the metal plate m, a second application roller 22, which rotates while contacting the lower surface of the metal plate m, first and second primer containers 23 and 24, each of which contains the primer, a first transfer roller 25, which rotates in the state of being partially submerged in the primer in the first primer container 23 to thereby transfer the primer attached to the outer circumferential surface thereof to the first application roller 21, and a second transfer roller 26, which rotates in the state of being partially submerged in the primer in the second primer container 24 to thereby transfer the primer attached to the outer circumferential surface thereof to the second application roller 22. In addition, the primer application unit 20 further includes guide rollers for guiding the metal plate m so that the upper surface and the lower surface of the metal plate m sequentially contact the surface of the first application roller 21 and the surface of the second application roller 22. Among the guide rollers, the main guide roller 27, having the largest outer circumference, additionally functions to support the metal plate m when the first application roller 21 contacts the upper surface of the metal plate m. It is desirable for the first application roller 21 and the second application roller 22 to be provided with a viscoelastic material, such as silicone, on the outer circumferential surface thereof. For convenience of description, an illustration of frames supporting the rollers and driving devices, among the components of the primer application unit 20, is omitted from the drawings.

Referring again to FIG. 1, the metal plate m, which is coated at one surface or both surfaces thereof with the primer by the primer application unit 20, moves forwards, and passes through a drying chamber 30, which is disposed horizontally on the surface of the ground. The drying chamber 30 heats and dries the primer applied to one surface or both surfaces of the metal plate m while the metal plate m passes therethrough.

The ascent induction unit 41, 42, 43, and 44 is configured to induce the metal plate m passing through the drying chamber 30 to ascend to the region above the aforementioned platform 61. To this end, the ascent induction unit 41, 42, 43, and 44 includes a lower conveyance power generation unit 41, which is disposed on the surface of the ground in front of the metal plate descent tower 60, an upper conveyance power generation unit 44, which is disposed on the platform 61 of the metal plate descent tower 60, and a plurality of guide rollers 42 and 43, which guide the ascent of the metal plate m from the lower conveyance power generation unit 41 to the upper conveyance power generation unit 44. The lower conveyance power generation unit 41 is configured to generate conveyance power for conveying the metal plate m while transforming the metal plate m into an S-shape using an S-shaped array of rubber rollers 411 and 412. Among the guide rollers 42 and 43, the guide roller 42 is mounted on one end of the platform 61 to primarily bend the metal plate m, which ascends at an incline from the lower conveyance power generation unit 41, so that the metal plate m moves toward the upper conveyance power generation unit 44, and the guide roller 43 secondarily bends the metal plate m so that the metal plate m becomes substantially parallel to the platform 61. The metal plate m approaches the metal plate discharge portion 62 formed in the platform 61 due to the conveyance power generated by the lower conveyance power generation unit 41 and the upper conveyance power generation unit 44 and the guidance by the guide rollers 42 and 43. The upper conveyance power generation unit 44 is configured to generate conveyance power for conveying the metal plate m while transforming the metal plate m into an S-shape using an S-shaped array of rubber rollers 441 and 442.

Figure 4:
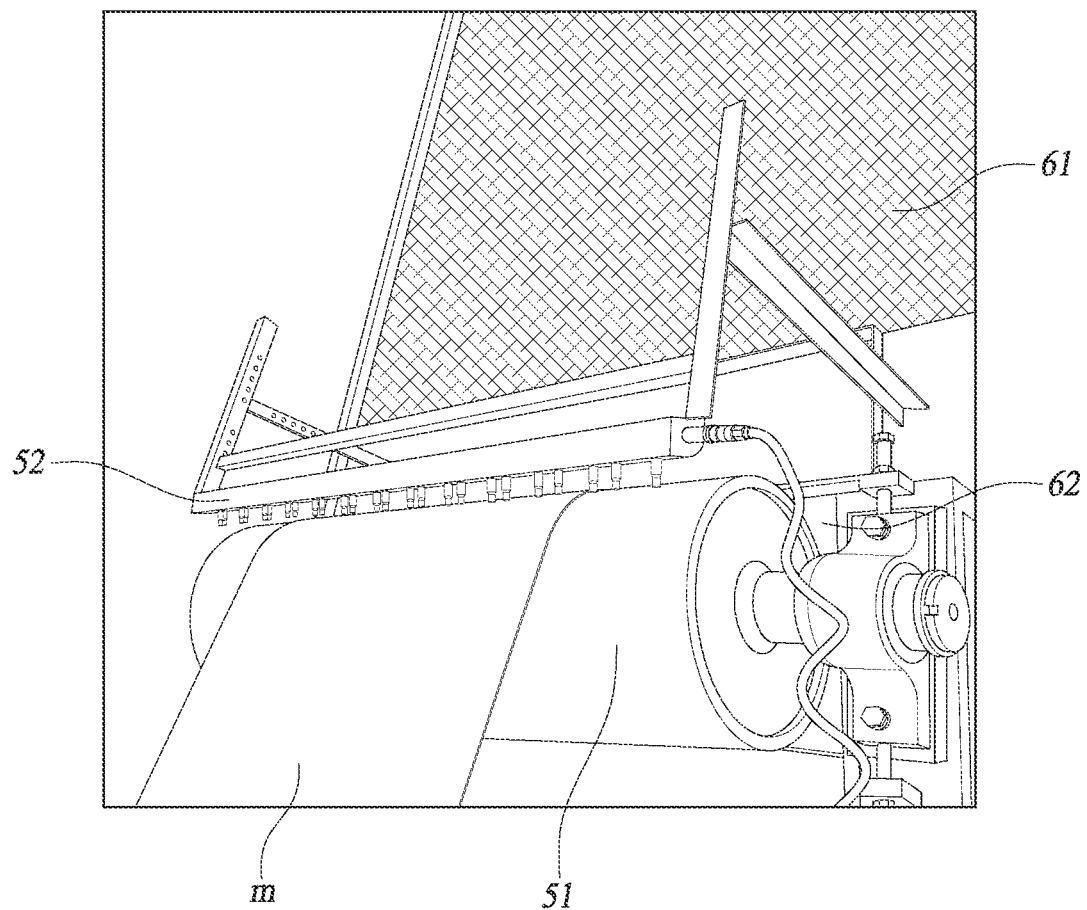
FIG. 4 is a picture for explaining a vertical descent induction unit of the thermal lamination apparatus according to an embodiment of the present invention.

The vertical descent induction unit 51 and 52 is provided to induce the metal plate m to descend vertically through the metal plate discharge portion 62 from the region above the platform 61. As shown in FIGS. 1 and 4, the vertical descent induction unit 51 and 52 includes a descent guide roller 51, which bends the metal plate m conveyed along the platform 61 so that the metal plate m passes through the metal plate discharge portion 62, and an aligner 52, which aligns the metal plate m with the metal plate discharge portion 62 so that the metal plate m is prevented from being biased to one side on the platform 61 when the metal plate m descends vertically through the metal plate discharge portion 62. The aligner 52 aligns the position of the metal plate m so that the metal plate m is prevented from being biased to the left or the right with respect to one side end thereof while the metal plate m is descending vertically.

Referring again to FIG. 1, the heating unit 70 is disposed directly below the metal plate discharge portion formed in the platform 61. It is desirable for the heating unit 70 to be implemented as an induction heater configured to heat the metal plate m while allowing the metal plate m, which is vertically descending through the metal plate discharge portion 62, to pass therethrough. The heat applied to the metal plate m by the heating unit 70 is used to thermally laminate the film f onto the surface of the metal plate m.

Figure 5:
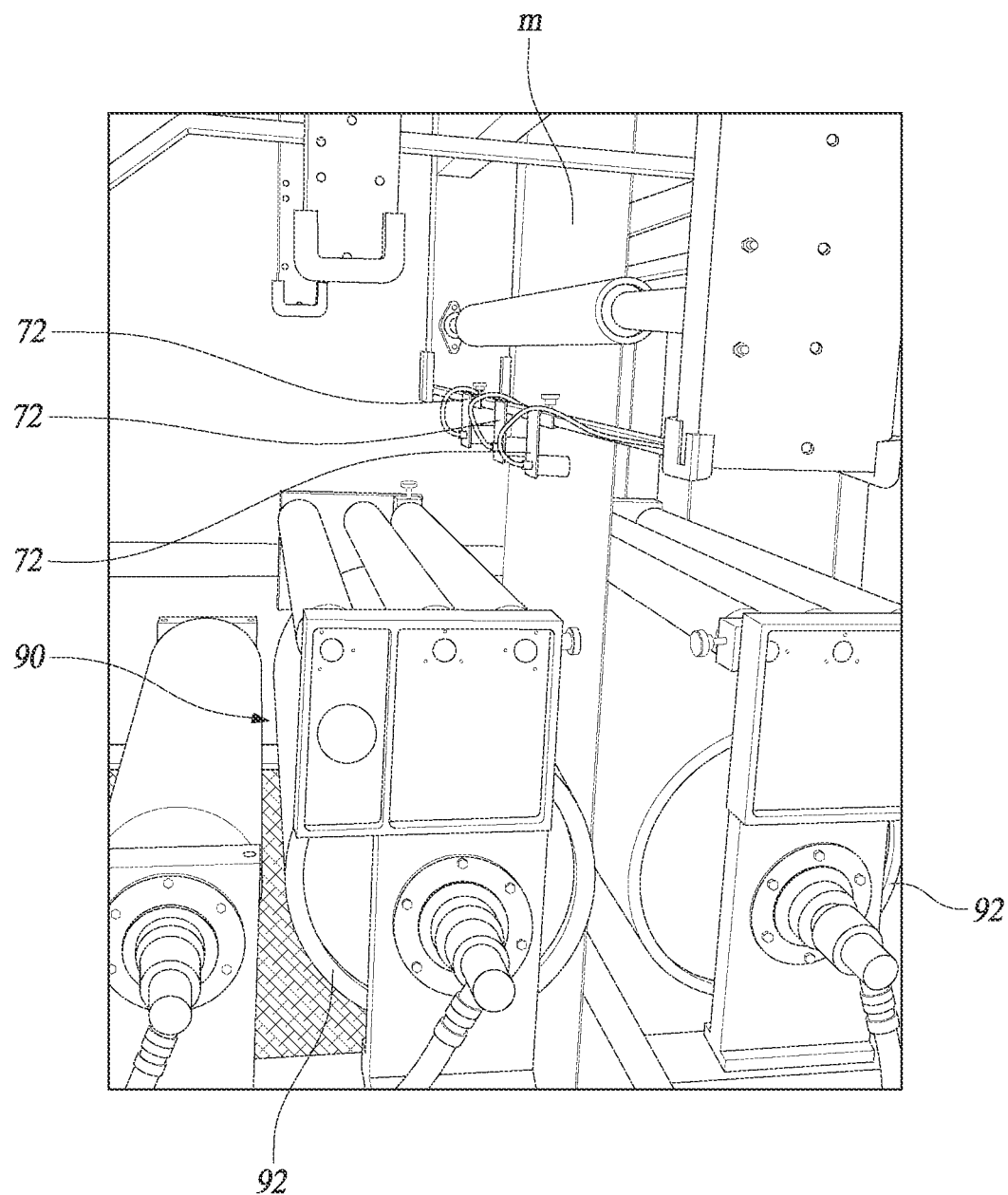
FIG. 5 is a picture for explaining a lamination unit of the thermal lamination apparatus according to an embodiment of the present invention.

Referring to FIGS. 1 and 5 together, the first film supply unit 80a and the second film supply unit 80b, which supply the films f to respective surfaces of the metal plate m, which vertically descends after being heated by the heating unit 70, and the lamination unit 90, which presses the heated metal plate m and the films f to form a film-laminated metal plate M, are disposed below the heating unit 70. Although not illustrated, each of the first film supply unit 80a and the second film supply unit 80b may include film supply rollers for supplying the film wound around a film retaining roller prior to lamination of the film and a cutting device for cutting the film. In addition, there may be further provided moving units for respectively moving the first film supply unit 80*a* and the second film supply unit 80*b* toward or away from the lamination unit 90.

In addition, a plurality of temperature sensors 72 for measuring the temperature of the metal plate m is disposed between the heating unit 70 and the lamination unit 90. The temperature to which the metal plate m is heated by the heating unit 70 is controlled based on the temperature of the metal plate m measured by the plurality of temperature sensors 72. If the temperature of the metal plate m is lower than a predetermined temperature, the film f may not be effectively laminated onto the metal plate m, and if the temperature of the metal plate m is higher than the predetermined temperature, the film f may be damaged by heat. Further, it is necessary to uniformly heat the entire area of the metal plate m. Therefore, it is necessary to measure the temperature over the entire area of the metal plate m. To this end, the plurality of temperature sensors 72 includes at least three temperature sensors 72, which are arranged along the width of the metal plate m in order to measure the temperatures of both ends and the center portion of the metal plate m heated by the heating unit 70. The lamination unit 90 is composed of a pair of press rollers 92 and 92 for pressing a pair of films f and f against respective surfaces of the metal plate m, with the pair of films f and f and the metal plate m located between the films interposed therebetween. The pair of press rollers 92 and 92 may be implemented as rollers including heat-resistant silicone.

In addition, the thermal lamination apparatus according to this embodiment further includes a cooling roller 110, a heat-insulating chamber 120, a pattern-forming unit 130, and a cooling unit 150, which are sequentially arranged between the lamination unit 90 and the re-coiling unit 180. The cooling roller 110, the heat-insulating chamber 120, and the pattern-forming unit 130 are disposed in a basement located below the surface of the ground G in order to sufficiently cool the film-laminated metal plate M descending vertically, to maintain the temperature of the film-laminated metal plate M, and to form a pattern on the film. In addition, an ascent induction roller 142 is disposed in the basement in order to induce the film-laminated metal plate M passing through the pattern-forming unit 130 to be bent upwards and to be conveyed to the ground. A conveyance power generation unit 143 is disposed on the ground in order to convey the film-laminated metal plate M conveyed to the ground toward the cooling unit 150. To this end, the conveyance power generation unit 143 includes an S-shaped array of rubber rollers.

The cooling roller 110 functions to rapidly cool the film-laminated metal plate M passing through the lamination unit 90. The cooling roller 110 may be implemented as a roller made of a metal material, such as an SUS material, which is cooled by cooling water or a refrigerant. The heat-insulating chamber 120 is configured to heat the film-laminated metal plate M cooled rapidly by the cooling roller 110 and to maintain the temperature of the heated film-laminated metal plate M. The heat-insulating chamber 120 may be mounted horizontally in the basement. The heat-insulating chamber 120 heats the film-laminated metal plate M to a temperature for forming a pattern on the film. It is desirable for the heating temperature not to exceed 150° C. The pattern-forming unit 130 is configured to form a pattern such as an embossing on the film of the film-laminated metal plate M heated by the heat-insulating chamber 120. The pattern-forming unit 130 may include a press roller designed so as to correspond to the pattern.

The film-laminated metal plate M conveyed upwards to the ground after the pattern is formed on the film thereof is cooled by the cooling unit 150. The cooling unit 150 includes a plurality of cooling rollers 152, which are in contact with the surface of the film-laminated metal plate M. Although not illustrated, a protective film may be laminated onto the cooled film-laminated metal plate M. A final conveyance power generation unit 160 and a re-coiling cutter 170 are sequentially arranged downstream of the cooling unit 150. The final conveyance power generation unit 160 finally pulls the film-laminated metal plate M so that the film-laminated metal plate M is wound around the re-coiling unit 180. The re-coiling cutter 170 cuts the film-laminated metal plate M in front of the re-coiling unit 180. The re-coiling cutter 170 has a configuration substantially identical to or similar to that of the above-described uncoiling cutter. The re-coiling unit 180 includes a re-coiling roller 182, which is rotated by hydraulic pressure to wind the film-laminated metal plate M thereon. That is, the re-coiling unit 180 has a configuration substantially similar to that of the above-described uncoiling unit.

The operation of the above-described thermal lamination apparatus will now be described with reference to FIG. 1.

When a new metal plate coil m' is loaded on the uncoiling unit 11, the end of the new metal plate coil m' and the end of the existing metal plate m are welded to each other by the welder 14, and then a new lamination process starts. The primer application unit 20 applies a primer for assisting in thermal lamination onto one surface or both surfaces of the metal plate m released from the uncoiling unit 11. The drying chamber 30 allows the metal plate m coated with the primer to pass therethrough, and dries the primer applied to one surface or both surfaces of the metal plate m while the metal plate m is passing therethrough. The metal plate m that has passed through the drying chamber 30 is conveyed upwards at an incline to the region above the platform 61 of the metal plate descent tower 60 by the ascent induction unit 41, 42, 43, and 44. The metal plate m conveyed upwards is vertically conveyed downwards through the metal plate discharge portion 62 formed in the platform 61 by the vertical descent induction unit 51 and 52. The heating unit 70, which is implemented as an induction heater, heats the metal plate m, which descends vertically. The first film supply unit 80*a* and the second film supply unit 80*b* respectively supply the films f to both surfaces of the heated metal plate m. The lamination unit 90 presses the film f, which is located on one surface or both surfaces of the heated metal plate m, against the metal plate m using the pair of press rollers 92 and 92. Accordingly, a film-laminated metal plate M having the film laminated onto one surface or both surfaces thereof is obtained. The film-laminated metal plate M descends to the basement, and is then brought into contact with the cooling roller 110 located in the basement. The film-laminated metal plate M is primarily cooled by the cooling roller 110. Subsequently, the film-laminated metal plate M is re-heated while passing through the heat-insulating chamber 120, and the pattern-forming unit 130 forms a pattern such as an embossing on the heated film of the film-laminated metal plate M. The film-laminated metal plate M having the pattern formed thereon ascends to the ground. Subsequently, the film-laminated metal plate M is cooled by the cooling unit 150, and is wound around the re-coiling unit 180. When the film-laminated metal plate M is completely wound, the film-laminated metal plate M is cut by the re-coiling cutter 170.

Although the preferred embodiments of the present invention have been described, the scope of the present invention is not limited to the foregoing description given with reference to the accompanying drawings.

For example, when it is required to form a pattern on the film of the film-laminated metal plate M using the pattern-forming unit 130, cooling water or a refrigerant may not be supplied to the cooling roller 110. When it is not required to form a pattern on the film of the film-laminated metal plate M, the pattern-forming unit 130 may be implemented as a general roller having no pattern, rather than a press roller having a pattern.

The operation of the above-described components may be controlled by a controller, which is not shown in the drawings.

As is apparent from the above description, according to the thermal lamination apparatus of the present invention, it is possible to reliably laminate a PET film or the like onto one surface or both surfaces of a metal plate without using an adhesive.

In addition, the thermal lamination apparatus of the present invention exhibits excellent productivity, and is environmentally friendly because the same is capable of thermally laminating a film onto the surface of a metal plate without using an adhesive.

However, the effects achievable through the invention are not limited to the above-mentioned effects, and other effects not mentioned herein will be clearly understood by those skilled in the art from the above description.

Although preferred embodiments of the present invention have been illustrated and described in order to exemplify the principle of the present invention, the present invention is not limited to the specific embodiments. It will be understood by those skilled in the art that various modifications and changes can be made without departing from the spirit and scope of the invention as defined by the appended claims.

What is claimed is:

1. A thermal lamination apparatus for manufacturing a film-laminated metal plate, the thermal lamination apparatus comprising:
    an uncoiling unit configured to rotatably support a metal plate coil to allow the metal plate coil to be uncoiled therefrom;
    a metal plate descent tower including a platform disposed so as to be spaced a predetermined height above a surface of a ground and a metal plate discharge portion formed in the platform;
    an ascent induction unit configured to induce a metal plate unwound from the metal plate coil to move to a region above the platform;
    a vertical descent induction unit configured to induce the metal plate to descend vertically through the metal plate discharge portion from the region above the platform;
    a heating unit disposed below the platform, the heating unit being configured to heat the metal plate descending vertically;
    a film supply unit configured to supply a film to at least one of both surfaces of the metal plate descending vertically after being heated by the heating unit;
    a lamination unit configured to press the heated metal plate and the film to acquire a film-laminated metal plate; and
    a re-coiling unit configured to re-coil and hold the film-laminated metal plate.

2. The thermal lamination apparatus according to claim 1, further comprising:
    a cooling roller configured to rapidly cool the film-laminated metal plate passing through the lamination unit;
    a heat-insulating chamber configured to heat the film-laminated metal plate cooled rapidly by the cooling roller;
    a pattern-forming unit configured to form a pattern on the film heated by the heat-insulating chamber; and
    a cooling unit configured to cool the film-laminated metal plate passing through the pattern-forming unit,
    wherein the cooling roller, the heat-insulating chamber, the pattern-forming unit, and the cooling unit are disposed between the lamination unit and the re-coiling unit.

3. The thermal lamination apparatus according to claim 2, wherein the cooling roller, the heat-insulating chamber, and the pattern-forming unit are disposed in a basement,
    wherein an ascent induction roller is disposed in the basement in order to convey the film-laminated metal plate passing through the pattern-forming unit to the ground, and
    wherein the cooling unit comprises a plurality of rotation cooling rollers configured to cool the film-laminated metal plate conveyed to the ground by the ascent induction roller while contacting the film-laminated metal plate.

4. The thermal lamination apparatus according to claim 1, wherein the film supply unit comprises a first film supply unit and a second film supply unit configured to supply films to the metal plate descending after being heated by the heating unit, and
    wherein the lamination unit comprises a pair of press rollers configured to press the films against the heated metal plate.

5. The thermal lamination apparatus according to claim 1, further comprising:
    an uncoiling cutter configured to cut an end of the metal plate coil when the metal plate is completely unwound from the metal plate coil;
    a welder configured to weld the end of the metal plate coil cut by the uncoiling cutter to an end of a new metal plate coil loaded on the uncoiling unit; and
    a re-coiling cutter configured to cut the film-laminated metal plate when the film-laminated metal plate is completely wound around the re-coiling unit.

6. The thermal lamination apparatus according to claim 1, further comprising:
    a primer application unit configured to apply a primer to one surface or both surfaces of the metal plate released from the uncoiling unit; and
    a drying chamber configured to dry the primer while the metal plate coated with the primer is passing therethrough.

7. The thermal lamination apparatus according to claim 6, wherein the primer application unit comprises:
    a first application roller configured to rotate while contacting an upper surface of the metal plate;
    a second application roller configured to rotate while contacting a lower surface of the metal plate;
    a first transfer roller configured to transfer the primer attached to an outer circumferential surface thereof to the first application roller; and
    a second transfer roller configured to transfer the primer attached to an outer circumferential surface thereof to the second application roller.

8. The thermal lamination apparatus according to claim 1, wherein the ascent induction unit comprises:
- a lower conveyance power generation unit disposed on the surface of the ground in front of the metal plate descent tower, the lower conveyance power generation unit comprising an S-shaped array of rubber rollers to generate power required to convey the metal plate;
- an upper conveyance power generation unit mounted on the platform of the metal plate descent tower, the upper conveyance power generation unit comprising an S-shaped array of rubber rollers to generate power required to convey the metal plate; and
- at least one guide roller configured to guide the metal plate conveyed from the lower conveyance power generation unit to the upper conveyance power generation unit.

9. The thermal lamination apparatus according to claim 1, wherein the vertical descent induction unit comprises:
- a descent guide roller configured to bend the metal plate conveyed along the platform to allow the metal plate to pass through the metal plate discharge portion; and
- an aligner configured to align the metal plate when the metal plate passes through the metal plate discharge portion.

10. The thermal lamination apparatus according to claim 1, wherein the heating unit comprises an induction heater, and
- wherein at least three temperature sensors are arranged along a width of the metal plate to measure temperatures of both ends and a center portion of the metal plate heated by the induction heater.

* * * * *